B. W. DUNNING.
Domestic Boiler.
No. 63,871.  Patented April 16, 1867.
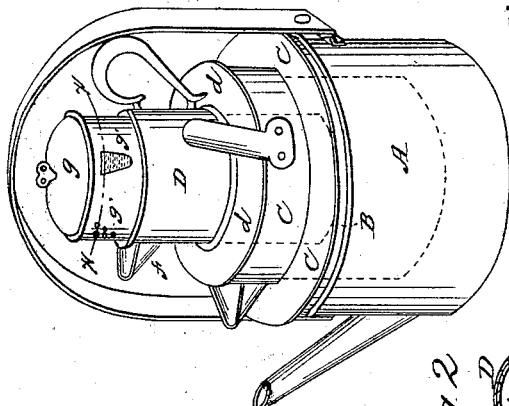
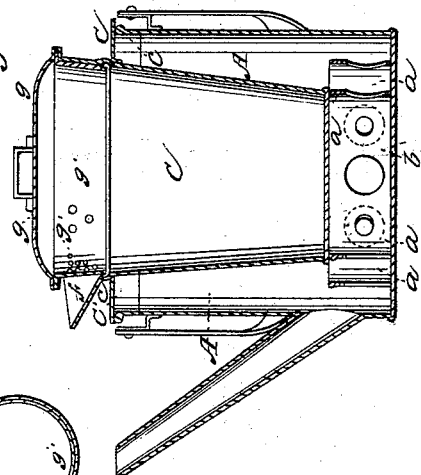
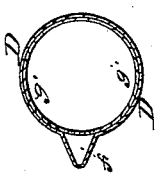
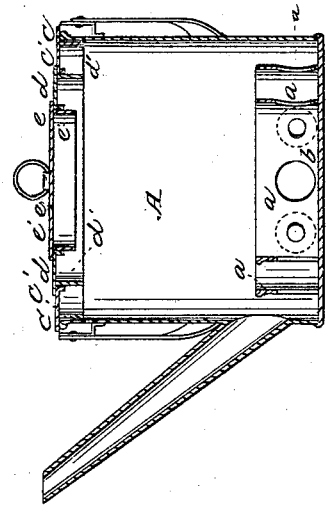
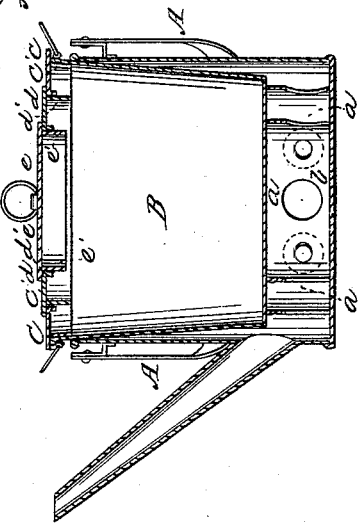
Witnesses:
Alex F. Roberts
C L Toplff
Inventor:
B. W. Dunning

United States Patent Office.

BENJAMIN W. DUNNING, OF BROOKLYN, NEW YORK.

Letters Patent No. 63,871, dated April 16, 1867.

COOKING KETTLE.

*The Schedule referred to in these Letters Patent and making part of the same.*

TO ALL WHOM IT MAY CONCERN:

Be it known that I, BENJAMIN W. DUNNING, of Brooklyn, Kings county, New York, have invented a new and improved Cooking Kettle; and I do hereby declare that the following is a full, clear, and exact description thereof, which will enable others skilled in the art to make and use the same, reference being had to the accompanying drawings, forming part of this specification, in which—

Figure 1 is a perspective view of my apparatus, when all parts are put together.

Figure 2 is a horizontal sectional view of the same, taken in the line $x\ x$, fig. 1.

Figures 3, 4, and 5 are vertical sectional views of the apparatus in its various combinations, and will be hereinafter referred to.

Similar letters of reference indicate corresponding parts.

The invention relates to a simple and valuable combination of the ordinary and indispensable culinary kettles, pans, and pots used by every family, whereby all the heat is made available, the different parts being so arranged that each one may be used for itself, or in combination with the rest, as may be desired. The invention relates also to an arrangement in the boiler or kettle for better conducting the heat to the inner vessels, and also to boil the water in the kettle quicker; and the invention relates further to an arrangement of the covers for pans and coffee-pots whereby the said pan or pot is closed air-tight while the boiling process is going on, while it is connected with a strainer through which the contents are poured out, and whereby they are separated from the grounds or larger parts in the vessel. This latter improvement is not only valuable for retaining the grounds of the coffee, but also for cooking vegetables, when the water can be easily poured out, leaving the articles in the vessel.

The apparatus consists of four different vessels, the boiler or kettle A, the meat-pan B, vegetable-pan C, and coffee-pot D. The kettle A is constructed as usual, with the exception of two perforated metal rings $a\ a$, which are soldered, cast, or otherwise secured to the inside of the bottom $b$ of the kettle. These rings being heated quicker than the water in the kettle, as the metal is a better heat conductor, tend to heat the water quicker; and when the vessel B or C is set into A, as seen in figs. 4 and 5, the rings come in contact with the bottoms of these vessels, as shown, increasing the same, whereby the articles in B or C are boiled quicker. The cover E of the kettle A consists of three parts, $c$, $d$, and $e$. $c$ is an annular plate, having a downward flange, $c'$, which fits exactly in the kettle, as shown in figs. 3, 4, and 5. $d$ is also an annular plate, with a flange, $d'$, which fits into the hole in $c$. $e$ is a circular plate, with a downward flange which fits into and closes the hole in $d$. All the three parts together constitute the complete cover for the kettle, as shown in fig. 3; and when applied to the same, the kettle can be used for boiling water, or as a tea-kettle, or for other purposes. When the vessel B is inserted into the kettle, as shown, either for cooking meat or vegetables, the cover E is applied to the vessel, as shown in fig. 4. The vessel is tapering, as shown, being larger in diameter at its top than at the bottom, and thus closes the kettle completely without requiring any other cover. For inserting smaller vessels into the kettle, the parts $e$ and $d$, or both, have to be removed from the cover, the rest being applied to A. Thus, for inserting the pan C, the ring $c$ only remains on A, and C is then inserted through it, as shown in fig. 5. The vessel C, which may be used for cooking vegetables, and for other purposes, is also tapering, as shown, so as to close the hole in the ring $c$. When the coffee-pot D is to be directly applied to the kettle A, the ring $d$ must be retained, the pot being as large in diameter as the plate $e$. By placing the vessel B into the kettle, and the ring $c$ upon B, the pan C may be inserted into B, and by placing the ring $d$ upon C, the coffee-pot D may be inserted into C. The latter arrangement is shown in fig. 1. In fact, the parts are so arranged, that, with the end of the covers $c$ and D any one part can be combined with any one of the others, as may be desired. The pots C and D are provided with spouts, $f$, as shown. The covers $g$ are provided each with a flange, $g'$, as shown which, when applied, closes the spout, and prevents any steam from escaping from the pot, thereby retaining the strength and aroma of the article. The flange $g'$ is perforated at certain parts with larger or smaller holes; and when the cover is turned so as to bring the spout $f$ in line with the perforated part of the flange, the liquid in the vessel may be poured out, and will be strained by the operation. By having different sets of holes of different diameters, the strainer may be employed for different articles or purposes.

I claim as new, and desire to secure by Letters Patent—

1. The adjustable covers $g$, for closing the vessels to which they are secured, and being provided with strainers, substantially as herein shown and described.

2. The combination with the rings $c$ and $d$, and plate $e$, of the vessels A, B, C, and D, or any one or more of them, substantially as and for the purpose herein shown and described.

BENJ. W. DUNNING.

Witnesses:
 WM. F. McNAMARA,
 ALEX. F. ROBERTS.